No. 640,690. Patented Jan. 2, 1900.
O. O'SULLIVAN.
NUT LOCK.
(Application filed Mar. 27, 1899.)

(No Model.)

Witnesses:
J. M. Fowler Jr
William E. Neff

Inventor:
Otho O'Sullivan,
by Gales P. Moore,
his Attorney.

UNITED STATES PATENT OFFICE.

OTHO O'SULLIVAN, OF STONINGTON, CONNECTICUT.

NUT-LOCK.

SPECIFICATION forming part of Letters Patent No. 640,690, dated January 2, 1900.

Application filed March 27, 1899. Serial No. 710,623. (No model.)

*To all whom it may concern:*

Be it known that I, OTHO O'SULLIVAN, a citizen of the United States, residing at Stonington, in the county of New London, State of Connecticut, have invented certain new and useful Improvements in Nut-Locks, of which the following is a description, reference being had to the accompanying drawings, and to the letters of reference marked thereon.

My present invention relates to improvements in nut-locks, and more particularly to that class of such devices in which the nut is, when applied, held within an inclosing member, and thus firmly clamped upon the bolt.

My objects are primarily to produce a nut so constructed that while it is by the inclosing member firmly forced upon the bolt it will not exert unnecessary strain upon said inclosing member, and, furthermore, to so construct the parts that there is presented an efficient and cheap inclosing member which can be manufactured without strain upon the stock.

To these ends and also to improve generally upon devices of the nature indicated my invention consists in the various matters hereinafter described and claimed.

Figure 1:
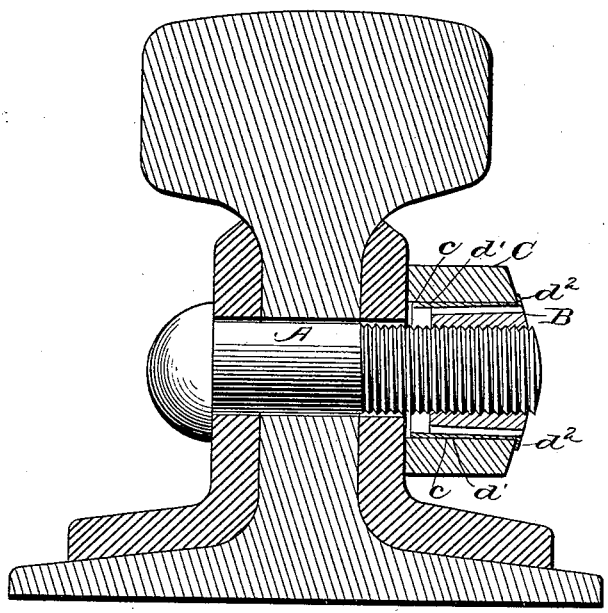
Figure 2:
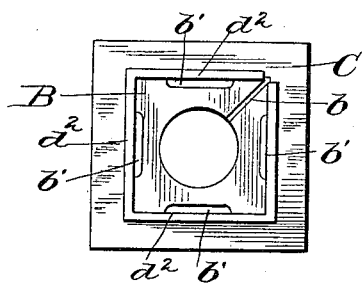

In the accompanying drawings, Figure 1 is an elevation, chiefly in section, showing the present nut-lock applied to a rail. Fig. 2 is a front elevation of the nut-lock alone, and Fig. 3 is a perspective view of the bushing.

Referring now more particularly to the drawings, A represents a bolt of any approved construction, and B the nut. As here shown, this latter member tapers inwardly—*i. e.*, toward the end adapted to lie adjacent the member to be clamped—and has a radial slot $b$ throughout its length, extending from one of its corners. Furthermore, for a purpose to be hereinafter explained, each face of the nut has a cut-away portion or longitudinal groove $b'$ intermediate its edges.

The inclosing member or collar C has an opening conforming in cross-section to the cross-section of the nut, here shown as square; but it is to be noted that the interior faces $c$ of the collar are substantially straight both longitudinally and transversely—*i. e.*, they do not conform to the grooved and tapered construction of the nut.

Figure 3:
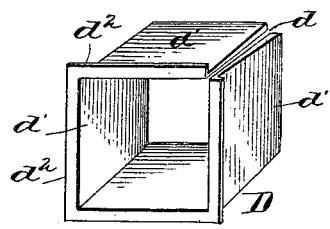

The remaining element of the device is the bushing D, illustrated particularly in Fig. 3, and, as will be seen, this casing is open at each end and conforms in cross-section to the nut, said bushing being adapted to fit between the nut and the collar. The bushing has a longitudinal slot $d$, here shown at one of its corners, to permit the casing to be fully contracted, and its side members $d'$ taper, their thicker portions being at their inner ends. Each side piece is at its outer end flared outwardly to present the flanges $d^2$.

Such being the construction of the various parts of the device, to apply the same the collar, with the bushing inclosed and the flanges $d^2$ beyond its outer face, is placed about the bolt, and the nut is then started along the threads, said nut being thus brought within the bushing. The collar is then rotated, and this action carries the nut farther along the bolt and within the bushing, the rotation of the parts being continued until the nut has been set as tightly as desired. As the nut enters the bushing it is compressed in a well-known manner, and the longitudinal grooves $b'$, intermediate the edges of the faces, permit ready yielding of the nut and relieve the members from the strain which would result were the grooves absent. The grooves being, however, on the faces and intermediate the edges of the same and extending only partly through the nut, the threaded portion of the nut is not reduced or in anywise interfered with and a sufficient bearing-surface is left for the bushing. Furthermore, it will be noticed that the inner surfaces of the compressing member, which lie adjacent the outer faces of the nut, are straight—*i. e.*, they do not extend into the grooves in the nut. Thus the nut is not held against transverse compression by the collar, but is left free to yield transversely along the inner faces of the compressing member, permitting the nut when compressed to yield evenly and distribute the strain.

By employing the tapering bushing I am enabled to use a collar with straight interior faces, as previously described, the bushing when in place producing the necessary taper to coöperate with the taper of the nut. The collar described is cheaply and easily manufactured, and, furthermore, by so constructing the collar I avoid the straining which would result were the interior faces tapered, it being practically impossible to make a tapering opening in a straight collar without causing strain on the stock. By providing the longitudinal slot in the bushing this member can be compressed for insertion into the collar, with which it fits snugly, and the flanges $d^2$ prevent separation of the collar and bushing when the parts are applied.

Having thus described my invention, what I claim as new, and desire to secure by Letters Patent, is—

1. The combination in a nut-lock, of a nut having its faces grooved longitudinally intermediate its edges, said grooves extending only partly through the nut, and a collar about said nut and compressing the same, the said collar not extending into the grooves and holding the nut against transverse compression but said nut being free to yield transversely along the inner faces of the compressing member, substantially as described.

2. The combination in a nut-lock, of a tapering nut, a collar having substantially straight interior faces, and a tapering bushing intermediate the nut and the collar; substantially as described.

3. The combination in a nut-lock, of a tapering nut, a collar having substantially straight interior faces, a tapering bushing intermediate the nut and the collar, and means for holding the bushing and collar against separation; substantially as described.

4. The combination in a nut-lock, of a tapering nut, a collar having substantially straight interior faces, a tapering bushing intermediate the nut and the collar, the bushing projecting beyond the collar, and an outwardly-projecting flange upon the outer end of the bushing and lying beyond the outer end of the collar, substantially as described.

5. A bushing of the nature indicated having tapering side members flared outwardly at their thinner ends to produce flanges; substantially as described.

In testimony whereof I affix my signature in presence of two witnesses.

OTHO O'SULLIVAN.

Witnesses:
F. A. ALLEN,
WM. C. DAVVAN.